(12) United States Patent
Tabrizi et al.

(10) Patent No.: US 10,911,811 B1
(45) Date of Patent: Feb. 2, 2021

(54) SYSTEMS AND METHODS FOR AUTOMATICALLY AND DYNAMICALLY GENERATING A NETWORK MAP

(71) Applicant: Recentive Analytics, Boston, MA (US)

(72) Inventors: Andysheh Tabrizi, Boston, MA (US); Evan Charles Smith, Lexington, MA (US)

(73) Assignee: Recentive Analytics, Boston, MA (US)

( * ) Notice: Subject to any disclaimer, the term of this patent is extended or adjusted under 35 U.S.C. 154(b) by 0 days.

(21) Appl. No.: 16/598,480

(22) Filed: Oct. 10, 2019

(51) Int. Cl.
| | |
|---|---|
| *H04N 21/262* | (2011.01) |
| *H04N 21/84* | (2011.01) |
| *H04N 21/24* | (2011.01) |
| *H04N 21/2187* | (2011.01) |

(52) U.S. Cl.
CPC ... *H04N 21/26283* (2013.01); *H04N 21/2187* (2013.01); *H04N 21/24* (2013.01); *H04N 21/84* (2013.01)

(58) Field of Classification Search
CPC ............... H04N 21/2187; H04N 21/24; H04N 21/26283; H04N 21/84
See application file for complete search history.

(56) References Cited

U.S. PATENT DOCUMENTS

| | | | | |
|---|---|---|---|---|
| 6,536,041 | B1* | 3/2003 | Knudson | H04N 21/235 725/39 |
| 2001/0000194 | A1* | 4/2001 | Sequeira | H04N 21/854 725/39 |
| 2005/0088407 | A1* | 4/2005 | Bell | H04N 21/812 345/156 |
| 2019/0297381 | A1* | 9/2019 | Chung | G06N 3/08 |

OTHER PUBLICATIONS https://the506.com, "NFL 2011", Apr. 25, 2012, https://the506.com/nflmaps.2011.html, pp. 1-3 (Year: 2012).*

* cited by examiner

*Primary Examiner* — Nicholas T Corbo
(74) *Attorney, Agent, or Firm* — Goodwin Procter LLP

(57) ABSTRACT

This application relates to systems and techniques for automatically and/or dynamically generating a network map. The network map can be updated based on a changed condition, which can include, among other things, a change in the underlying schedule and/or underlying data (e.g., weather data, news data, etc.). The network map can be updated in real time and/or in accordance with a predetermined schedule.

19 Claims, 4 Drawing Sheets

| station | 1pm game | 4pm game | state | city |
|---|---|---|---|---|
| DWAY | BAL-KC | HOU-LAC | NC | Wilmington |
| EENY | NYJ-NE | PIT-SF | NY | Elmira-corning |
| EKTV | NYJ-NE | PIT-SF | NY | Utica |
| ELOX | ATL-IND | NO-SEA | MS | Biloxi |
| EOHL | CIN-BUF | HOU-LAC | OH | Lima |
| ESVF | BAL-KC | PIT-SF | VA | Harrisonburg |
| GBBJ | BAL-KC | NO-SEA | TN | Jackson |
| KAJ | BAL-KC | HOU-LAC | MT | Kalispell |
| KAUZ | DET-PHI | PIT-SF | TX | Wichita Falls |
| KBAK | DET-PHI | HOU-LAC | CA | Bakersfield |
| KBIM | BAL-KC | PIT-SF | NM | Roswell |
| KBNZ | BAL-KC | PIT-SF | OR | Bend |
| KBOI | CIN-BUF | NO-SEA | ID | Boise |
| KBSD | BAL-KC | NO-SEA | KS | Dodge City/Ensign |
| KBSH | BAL-KC | NO-SEA | KS | Hays |
| KBSL | BAL-KC | NO-SEA | KS | Goodland |
| KBTX | BAL-KC | HOU-LAC | TX | Bryan |
| KBZK | BAL-KC | HOU-LAC | MT | Bozeman |
| KCBS | BAL-KC | HOU-LAC | CA | Los Angeles |
| KCBY | BAL-KC | PIT-SF | OR | Coos Bay |
| KCCI | BAL-KC | HOU-LAC | IA | Des Moines |

SYSTEMS AND METHODS FOR AUTOMATICALLY AND DYNAMICALLY GENERATING A NETWORK MAP

TECHNICAL FIELD

In general, various embodiments of this invention relate to the generation of network maps and, specifically, to a technique for automatically and dynamically generating a network map based on changing conditions.

BACKGROUND

Many events require the generation of a network map. As used herein, the term network map refers to a schedule that outlines which content will be displayed on which channel at a certain time. As one example, the National Football League® ("NFL") needs to generate a network map for the numerous NFL football games played on Sundays, many of which are played simultaneously. The NFL needs to determine which content (games) will be displayed on which channel (television channels) at which times (usually 1 pm and 4 pm ET). The current system for generating such maps has several negative features. For example, the current process is entirely manual, static and incapable of responding to changing conditions, fixed on one default configuration and unable to consider multiple possible schedule permutations or configurations, and unable to forecast the impact of a proposed schedule change.

Accordingly, there exists a need for an improved technique for generating network maps.

SUMMARY OF THE INVENTION

This application describes an improved technique for generating a network map that solves many of the drawbacks of conventional techniques. In particular, aspects of the present invention relate to an automated technique for generating a network map. In some instances, the technique is automated such that it is generated based on a computer algorithm designed to optimize a certain parameter (e.g., highest overall projected ratings, highest projected ratings in a particular market, etc.). In addition, in some implementations, the algorithm is based on real time data and the map can be dynamically updated based on changing conditions (e.g., an adjusted schedule, weather data, news data, etc., described in more detail below). In general, this application will describe generation of a network map using the example of the network map required for the NFL's Sunday games. However, the invention is broader than this example and can be applied to the generation of a network map for any type of content (e.g., any sporting event, such as NBA, MLB, NHL, MLS games, the Olympics, golf matches, etc. and non-sporting events such as dramatic television programs, movies, live streaming events, etc.) distributed across any type of channel (e.g., television channels, radio, internet, and in person events (e.g., at music festivals, conventions, etc.)).

In general, in one aspect, embodiments of the invention feature a computer-implemented method for dynamically generating a network map. The method can include the steps of receiving a schedule for a plurality of events; generating a network map based on the schedule; and automatically updating the network map based on at least one of (i) a change to the schedule and (ii) updated data.

In various embodiments, the plurality of events can include sporting events (e.g., NFL games). In some instances, the network map includes a description of which event will be displayed on which channel at a particular time. In some cases, the channel includes a television channel. The change to the schedule can include a manual change performed by a user. The updated data can include weather data, news data, gambling data, among many others. In some instances, the step of automatically updating the network map includes optimizing the network map based on a particular parameter (e.g., projected overall rating or projected rating in a certain market). The step of automatically updating the network map can occur in real time. In some implementations, the step of automatically updating the network map can include using a machine learning technique. The method can also include, prior to the receiving step, generating the schedule for the plurality of events. In some cases, the step of generating the schedule can include using a machine learning technique.

In general, in another aspect, embodiments of the invention feature a system for dynamically generating a network map. The system can include one or more computers programmed to perform operations that include: receiving a schedule for a plurality of events; generating a network map based on the schedule; and automatically updating the network map based on at least one of (i) a change to the schedule and (ii) updated data.

In various embodiments, the plurality of events include sporting events. In some instances, the network map includes a description of which event will be displayed on which channel at a particular time. In some instances, the updated data includes weather data, news data, and/or gambling data, among many other types of data. In some implementations, automatically updating the network map includes optimizing the network map based on a particular parameter. The step of automatically updating the network map can occur in real time. In some implementations, the operations can also include, prior to the receiving step, generating the schedule for the plurality of events.

BRIEF DESCRIPTION OF THE FIGURES

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

Figure 1A:
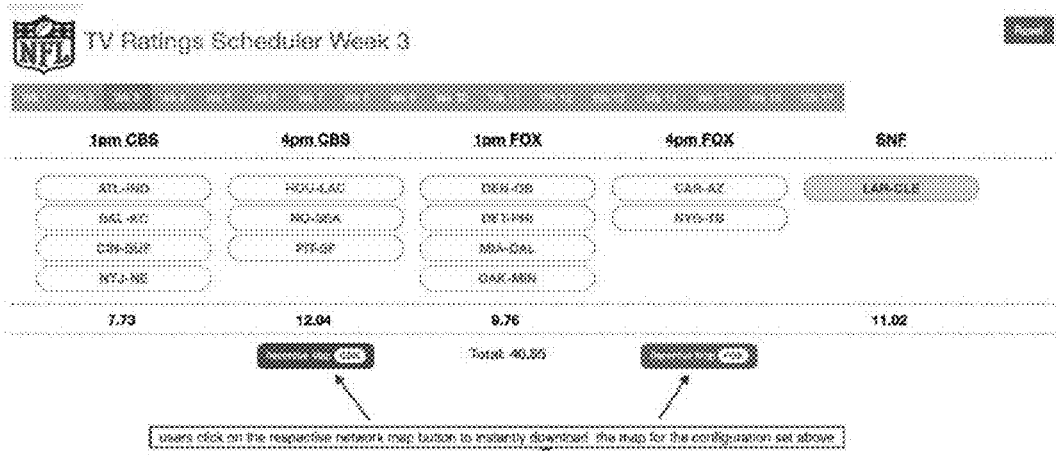
FIG. 1A is an example graphical user interface illustrating an NFL Sunday game schedule.

Embodiments of the present invention are directed to an improved technique for generating a network map. As stated above, the term network map refers to a schedule that outlines which content will be displayed on a certain channel at a certain time. Generally, a network map is based upon an underlying schedule for a plurality of events. For example, the underlying schedule can be a schedule for the NFL's Sunday games, as shown in FIG. 1A. In some instances, the underlying schedule can be generated using a conventional technique, e.g., manually. In other instances, the underlying schedule is generated using an automated technique. For example, the automated technique can include a computer algorithm designed to optimize a particular parameter, such as overall television ratings for the NFL across all games, ratings for the NFL with a particular affiliate (CBS or FOX), ratings for the NFL in a particular market, with a particular audience, or at a particular time. As shown in FIG. 1A, the projected overall ratings for the 1 pm and 4 pm games on each of CBS and FOX are shown in the bottom row and the total overall NFL ratings across all games is centered underneath. Many other parameters are possible and contemplated.

In certain implementations, the computer algorithm can be developed using a machine learning technique. In general, any suitable machine learning technique can be used, for example, a gradient boosted random forest, a regression, a neural network, a decision tree, a support vector machine, a Bayesian network, etc., as just a few examples. The machine learning technique can be trained using any suitable training data. A few non-limiting examples include weather data, news data, and/or gambling data (e.g., odds data generated by sports books).

Figure 1B:
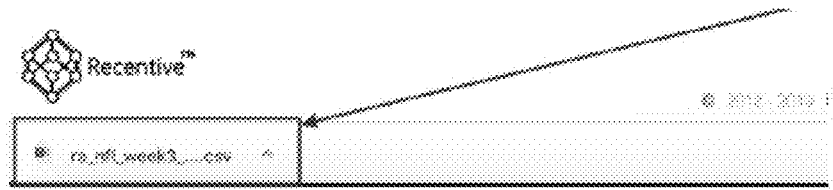
FIG. 1B is an example network map generated for the schedule shown in FIG. 1A.

Regardless of how the underlying schedule is generated, implementations of the present invention can automatically generate a network map that describes which games will be shown on which channels at which time. FIG. 1B shows an example network map for the schedule shown in FIG. 1A. In FIG. 1B the leftmost column lists a television channel (in this example affiliates of CBS or FOX in various cities), the column titled 1 pm game lists the games to be displayed at 1 pm, and the column titled 4 pm game lists the games to be displayed at 4 pm. In some cases, separate network maps can be generated for affiliates of a particular broadcaster (e.g., CBS, FOX, etc.). As shown in FIG. 1A, a user can select a first icon to generate a CBS-affiliate network map and a different icon to generate a FOX-affiliate network map.

In general, the network map can be automatically generated using any suitable technique. In some implementations, the network map is generated so as to optimize a particular parameter. This parameter can be the same parameter or a different parameter as the parameters described above used to generate the underlying schedule. For example, overall television ratings for the NFL across all games, ratings for the NFL with a particular affiliate (CBS or FOX), ratings for the NFL is a particular market, with a particular audience, or at a particular time. The network map can also be generated based on certain criteria or rules (e.g., user submitted rules). In general any rule can be used. As one example a user may say that a particular game cannot be shown in a particular market regardless of what the other data indicates (e.g., NE-BAL can never be shown in Orlando).

Figures 2A, 2B:
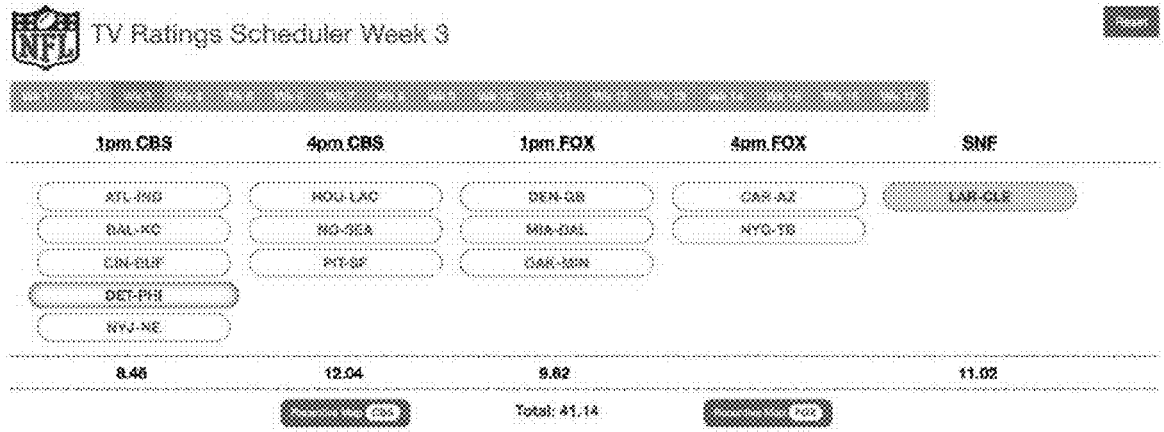
FIG. 2A is an example graphical user interface illustrating an NFL Sunday game schedule that has been modified from the schedule shown in FIG. 1A.
FIG. 2B is an example network map generated for the schedule shown in FIG. 2A.

In some embodiments, the network map can be dynamically updated based on changing conditions. In general, any changed condition can result in an update to the network map. For example, a change in the underlying schedule can result in an update to the network, as illustrated in FIGS. 2A-2B. FIG. 2A shows a NFL game schedule with a change made from the schedule shown in FIG. 1A. In particular, the DET-PHI game has been moved from the 1 pm FOX slot (FIG. 1A) to the 1 pm CBS slot (FIG. 2A). This change in schedule can be done manually by a user or it can be done automatically based on the techniques described above. The change in the underlying schedule can cause an automatic update to the network map, as illustrated in FIG. 2B. With reference to stations KAUZ and KBAK, in the FIG. 1B network map these stations are scheduled to display the NYJ-NE game; however, once the change to the schedule occurs, in the FIG. 2B network maps these stations are scheduled to display the DET-PHI game. This update is made automatically and dynamically because the algorithm used to determine the network map now optimizes the DET-PHI game on the KAUZ and KBAK stations at 1 pm over the NYJ-NE game. Changes to the underlying schedule can also result in other automatic updates. For example, comparing FIG. 1A to FIG. 2A shows that the change in the DET-PHI game resulted in adjusted projections (both for each game slot and the total projections).

The network map can also be dynamically updated based on changing data, e.g., the data underlying the algorithm that automatically generates the network map. In general, changes to any type of data underlying the algorithm can result in a change to the network map. As one non-limiting example to illustrate the concept, the algorithm may rely on weather data and have a preference for displaying games in markets where the weather forecast is cold, because more people are likely stay inside and watch television if the weather is cold. If, however, the weather forecast changes such that a market where it was originally forecast to be cold is now forecast to be warm, the algorithm may determine that a different game should be displayed in that market. Many additional examples are possible, based on any type of changing underlying data.

Figures 3A, 3B, 3C:
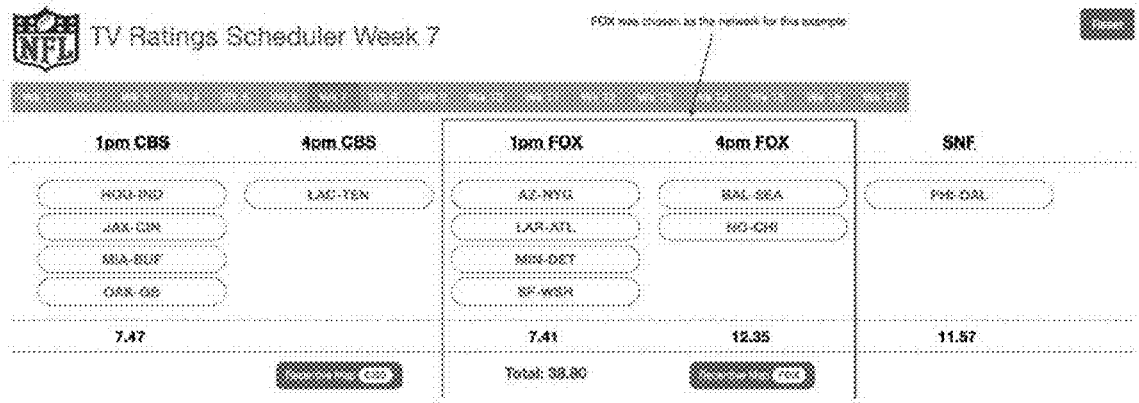
FIG. 3A is an example graphical user interface illustrating another NFL Sunday game schedule.
FIG. 3B is an example network map generated for the schedule shown in FIG. 3A at a first point in time.
FIG. 3C is an example network map generated for the schedule shown in FIG. 3A at a second point in time, different than the first point in time shown in FIG. 3B.

A comparison of FIGS. 3B and 3C illustrates this concept. The network map shown in FIG. 3B was generated on Sep. 8, 2019 and the network map shown in FIG. 3C was generated on Sep. 17, 2019. The network maps are different without any change to the underlying schedule shown in FIG. 3A. The cause of these changes is changes in the data underlying the algorithm that automatically generates the network map, e.g., weather data, news data, gambling data, etc.

The system can be configured such that the network map is updated in real time. In some instances, the network map may be updated in accordance with a predetermined schedule. For example, the network map can be updated with a predetermined frequency (e.g., every minute, every hour, every day, etc.) until a predetermined amount of time before the games are played (e.g., 1 day, 1 week, etc.) at which point the schedule is locked in. In other instances, the networks can display games based on updates that occur during the games. So, if the underlying data changes mid-game such that a different game should be displayed in a particular market, the network can switch the broadcast at that time.

In some embodiments, the network maps can be archived according to a predetermined schedule (e.g., every hour, every day, etc.). This archiving can allow a user to determine and view how the map has changed over time.

In various embodiments, the inventive system described herein can also automatically generate reports and analytics based on the generated network maps. Example information in these reports can include summary statistics (e.g., percentage of the country that views a particular game, e.g., NE-BAL viewed by 43% of stations, GB-SF viewed by 57% of stations, etc.), thematic trend analysis (e.g., changes in bet wagers on a particular team, changes in merchandise sales, etc.), among many other types of information.

Operating Apparatus

Figure 4:
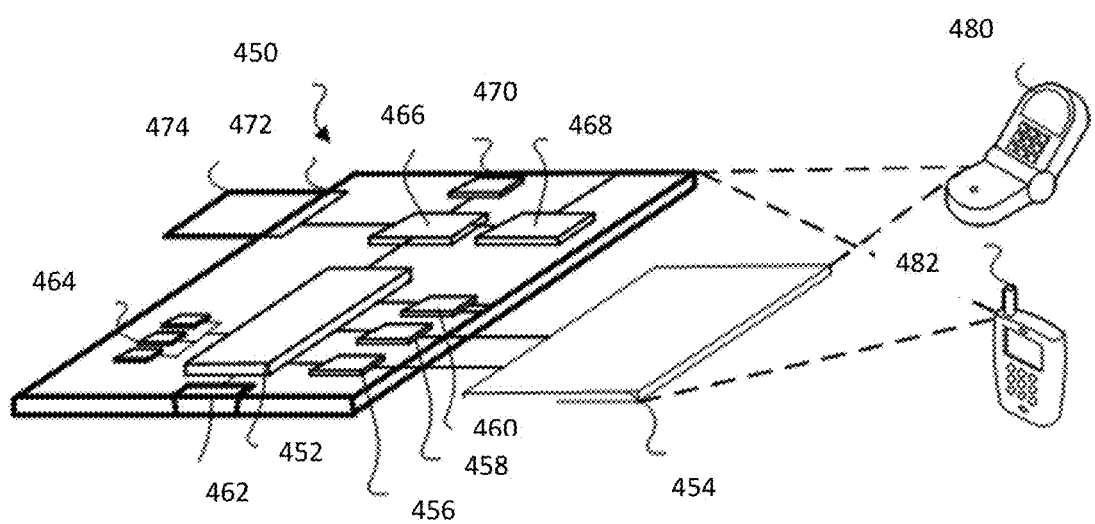
FIG. 4 illustrates an example computer system that can perform certain implementations of the techniques described herein.

FIG. 4 shows an example of a generic computing device 450, which may be used with the techniques described in this disclosure. Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may in some cases be a cellular modem. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in FIG. 4. For example, it may be implemented as a cellular telephone 480. It may also be implemented as part of a smartphone 482, smart watch, personal digital assistant, or other similar mobile device.

Operating Environment

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method for dynamically generating a network map, the method comprising:
    receiving a schedule for a first plurality of live events scheduled to start at a first time and a second plurality of live events scheduled to start at a second time;
    generating, based on the schedule, a network map mapping the first plurality of live events and the second plurality of live events to a plurality of television stations for a plurality of cities,
        wherein each station from the plurality of stations corresponds to a respective city from the plurality of cities,
        wherein the network map identifies for each station (i) a first live event from the first plurality of live events that will be displayed at the first time and (ii) a second live event from the second plurality of live events that will be displayed at the second time, and
        wherein generating the network map comprises using a machine learning technique to optimize an overall television rating across the first plurality of live events and the second plurality of live events;
    automatically updating the network map on demand and in real time based on a change to at least one of (i) the schedule and (ii) underlying criteria,
        wherein updating the network map comprises updating the mapping of the first plurality of live events and the second plurality of live events to the plurality of television stations; and
    using the network map to determine for each station (i) the first live event from the first plurality of live events that will be displayed at the first time and (ii) the second live event from the second plurality of live events that will be displayed at the second time.

2. The method of claim 1, wherein the first plurality of live events and the second plurality of live events comprise sporting events.

3. The method of claim 2, wherein the sporting events comprise NFL games.

4. The method of claim 1, wherein the network map comprises a description of which event will be displayed on which station at a particular time.

5. The method of claim 1, wherein the change to the schedule comprises a manual change performed by a user.

6. The method of claim 1, wherein generating the network map comprises generating the network map based on at least one of weather data, news data, or gambling data.

7. The method of claim 1, wherein the step of automatically updating the network map comprises optimizing the network map based on a particular parameter.

8. The method of claim 7, wherein the particular parameter comprises the overall rating or a projected rating in a certain market for the plurality of television stations.

9. The method of claim 1, further comprising, prior to the receiving step, generating the schedule for the first plurality of live events and the second plurality of live events.

10. The method of claim 1, wherein the automatically updating step comprises generating multiple network maps based on multiple user entered changes.

11. The method of claim 1, wherein the first time and the second time occur on a same day.

12. A system for dynamically generating a network map, the system comprising:
    one or more computer processors programmed to perform operations comprising:
        receiving a schedule for a first plurality of live events scheduled to start at a first time and a second plurality of live events scheduled to start at a second time;

generating, based on the schedule, a network map mapping the first plurality of live events and the second plurality of live events to a plurality of television stations for a plurality of cities,
  wherein each station from the plurality of stations corresponds to a respective city from the plurality of cities,
  wherein the network map identifies for each station (i) a first live event from the first plurality of live events that will be displayed at the first time and (ii) a second live event from the second plurality of live events that will be displayed at the second time, and
  wherein generating the network map comprises using a machine learning technique to optimize an overall television rating across the first plurality of live events and the second plurality of live events;
automatically updating the network map on demand and in real time based on a change to at least one of (i) the schedule and (ii) underlying criteria,
  wherein updating the network map comprises updating the mapping of the first plurality of live events and the second plurality of live events to the plurality of television stations; and
using the network map to determine for each station (i) the first live event from the first plurality of live events that will be displayed at the first time and (ii) the second live event from the second plurality of live events that will be displayed at the second time.

13. The system of claim 12, wherein the first plurality of live events and the second plurality of live events comprise sporting events.

14. The system of claim 12, wherein the network map comprises a description of which event will be displayed on which station at a particular time.

15. The system of claim 12, wherein generating the network map comprises generating the network map based on at least one of weather data, news data, or gambling data.

16. The system of claim 12, wherein automatically updating the network map comprises optimizing the network map based on the overall television rating or a projected rating in a certain market for the plurality of television stations.

17. The system of claim 12, wherein the operations further comprise, prior to the receiving step, generating the schedule for the first plurality of live events and the second plurality of live events.

18. The system of claim 12, wherein the automatically updating operation comprises generating multiple network maps based on multiple user entered changes.

19. The system of claim 12, wherein the first time and the second time occur on a same day.

* * * * *